(12) United States Patent
McCormick

(10) Patent No.: US 9,676,279 B2
(45) Date of Patent: Jun. 13, 2017

(54) PARALLEL REGENERATION BRAKE TORQUE MODULATION SYSTEM AND METHOD

(71) Applicant: Ford Global Technologies, LLC, Dearborn, MI (US)

(72) Inventor: John Phillip McCormick, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 13/708,960

(22) Filed: Dec. 8, 2012

(65) Prior Publication Data

US 2014/0158448 A1    Jun. 12, 2014

(51) Int. Cl.
| | |
|---|---|
| *B60T 7/06* | (2006.01) |
| *B60T 8/171* | (2006.01) |
| *B60T 8/172* | (2006.01) |
| *B60L 7/18* | (2006.01) |
| *B60K 6/20* | (2007.10) |
| *B60K 6/52* | (2007.10) |
| *B60L 7/26* | (2006.01) |
| *B60L 11/14* | (2006.01) |
| *B60L 15/20* | (2006.01) |
| *B60W 30/18* | (2012.01) |

(52) U.S. Cl.
CPC ......... *B60L 7/18* (2013.01); *B60K 6/20* (2013.01); *B60K 6/52* (2013.01); *B60L 7/26* (2013.01); *B60L 11/14* (2013.01); *B60L 15/2009* (2013.01); *B60T 7/06* (2013.01); *B60T 8/171* (2013.01); *B60T 8/172* (2013.01); *B60W 30/18127* (2013.01); *B60L 2240/423* (2013.01); *B60L 2250/26* (2013.01); *B60W 2540/12* (2013.01); *Y02T 10/6265* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/947* (2013.01)

(58) Field of Classification Search
CPC ............ B60T 8/171; B60T 8/172; B60T 7/06
USPC ..... 180/275, 244, 282; 303/151, 152, 113.4, 303/113.5; 188/159
See application file for complete search history.

(56) References Cited

U.S. PATENT DOCUMENTS

| | | | | |
|---|---|---|---|---|
| 4,543,789 | A | * | 10/1985 | Norton .......................... 60/545 |
| 5,217,280 | A | * | 6/1993 | Nykerk et al. .................... 303/3 |
| 5,253,929 | A |   | 10/1993 | Ohori |
| 5,511,866 | A | * | 4/1996 | Terada et al. ................. 303/152 |
| 5,927,829 | A | * | 7/1999 | Saga et al. .................... 303/152 |
| 5,967,621 | A | * | 10/1999 | Ito et al. ......................... 303/15 |

(Continued)

FOREIGN PATENT DOCUMENTS

JP    2011167008 A  *  8/2011

*Primary Examiner* — Joseph Rocca
*Assistant Examiner* — Daniel Yeagley
(74) *Attorney, Agent, or Firm* — David Kelley, Esq.; Tung & Associates

(57) ABSTRACT

A parallel regeneration brake torque modulation system for an electrified vehicle includes a brake pedal travel sensor adapted to transmit a brake pedal travel sensor signal upon travel of a vehicle brake pedal through at least a portion of a range of motion; and a regenerative braking system adapted to apply regeneration braking torque to a vehicle using the brake pedal travel sensor signal from the brake pedal travel sensor.

17 Claims, 2 Drawing Sheets

(56) References Cited

U.S. PATENT DOCUMENTS

| | | | | |
|---|---|---|---|---|
| 6,655,754 | B2* | 12/2003 | Crombez | B60L 7/26 188/156 |
| 6,663,197 | B2* | 12/2003 | Joyce | B60L 7/26 188/156 |
| 6,910,747 | B2* | 6/2005 | Tsunehara | 303/152 |
| 6,959,971 | B2* | 11/2005 | Tsunehara | 303/152 |
| 7,503,631 | B2 | 3/2009 | Tezuka | |
| 2006/0001314 | A1* | 1/2006 | Teslak | B60K 6/12 303/152 |
| 2008/0001473 | A1* | 1/2008 | Mizutani et al. | 303/113.5 |
| 2008/0051965 | A1* | 2/2008 | Nakamura | 701/70 |
| 2008/0224478 | A1* | 9/2008 | Tamor | 290/40 C |
| 2010/0006380 | A1 | 1/2010 | Futahashi et al. | |
| 2010/0036577 | A1* | 2/2010 | Kodama et al. | 701/76 |
| 2011/0049969 | A1 | 3/2011 | Park | |
| 2012/0175200 | A1* | 7/2012 | Sagan et al. | 188/159 |
| 2012/0325573 | A1* | 12/2012 | Miller | 180/282 |
| 2013/0244829 | A1* | 9/2013 | Nefcy | B60W 10/08 477/15 |

\* cited by examiner

PARALLEL REGENERATION BRAKE TORQUE MODULATION SYSTEM AND METHOD

FIELD

Illustrative embodiments of the disclosure generally relate to regenerative braking. More particularly, illustrative embodiments of the disclosure relate to a parallel regeneration brake torque modulation system and method in which a regeneration brake system pedal travel sensor is used to control parallel regenerative braking in a vehicle.

BACKGROUND

To improve fuel economy, hybrid electric vehicles (HEVs) may utilize regenerative (regen) braking, in which kinetic energy is converted by an electric machine into storable energy during braking and then made available for vehicle propulsion. Currently, parallel regen braking is controlled via a BOO (Brake On/Off) switch. When the BOO switch closes during a braking event, the regen powertrain applies a fixed magnitude of brake torque to stop the vehicle. Although the torque can be ramped up and down via cal parameters, torque control is limited due to the step function behavior of the BOO switch. As a result, vehicle braking events can be somewhat uneven.

The parallel regeneration brake system may include a regeneration brake system pedal travel sensor which senses the travel position of the vehicle brake pedal over a continuous range of positions of the pedal. Therefore, signals from the sensor may be used to control operation of the BOO switch such that the BOO switch controls the brake torque of the regen powertrain over a continuous range, evening out the vehicle braking events.

Accordingly, a parallel regeneration brake torque modulation system and method in which a regeneration brake system pedal travel sensor is used to control parallel regenerative braking in a vehicle are needed.

SUMMARY

The disclosure is generally directed to a parallel regeneration brake torque modulation system for an electrified vehicle. An illustrative embodiment of the system includes a brake pedal travel sensor adapted to transmit a brake pedal travel sensor signal upon travel of a vehicle brake pedal through at least a portion of a range of motion; and a regenerative braking system adapted to apply regeneration braking torque to a vehicle using the brake pedal travel sensor signal from the brake pedal travel sensor.

In some embodiments, the parallel regeneration brake torque modulation system may include a vehicle having a front axle with front wheels and a rear axle with rear wheels; a regeneration powertrain coupled and adapted to apply regeneration torque to at least one of the front and rear axles; a brake pedal travel sensor interfacing with the regeneration powertrain; a vehicle brake pedal interfacing with the brake pedal travel sensor, the brake pedal travel sensor adapted to transmit a brake pedal travel sensor signal to the regeneration powertrain upon travel of the vehicle brake pedal through at least a portion of a range of motion; and a brake on/off switch interfacing with the regeneration powertrain. The regeneration powertrain is adapted to apply regeneration torque to the at least one of the front and rear axles responsive to receiving a brake pedal travel sensor signal from the brake pedal travel sensor.

The disclosure is further generally directed to a parallel regeneration brake torque modulation method. An illustrative embodiment of the method includes using a brake pedal travel sensor signal to control parallel regeneration of a vehicle if the brake pedal travel sensor signal is available.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
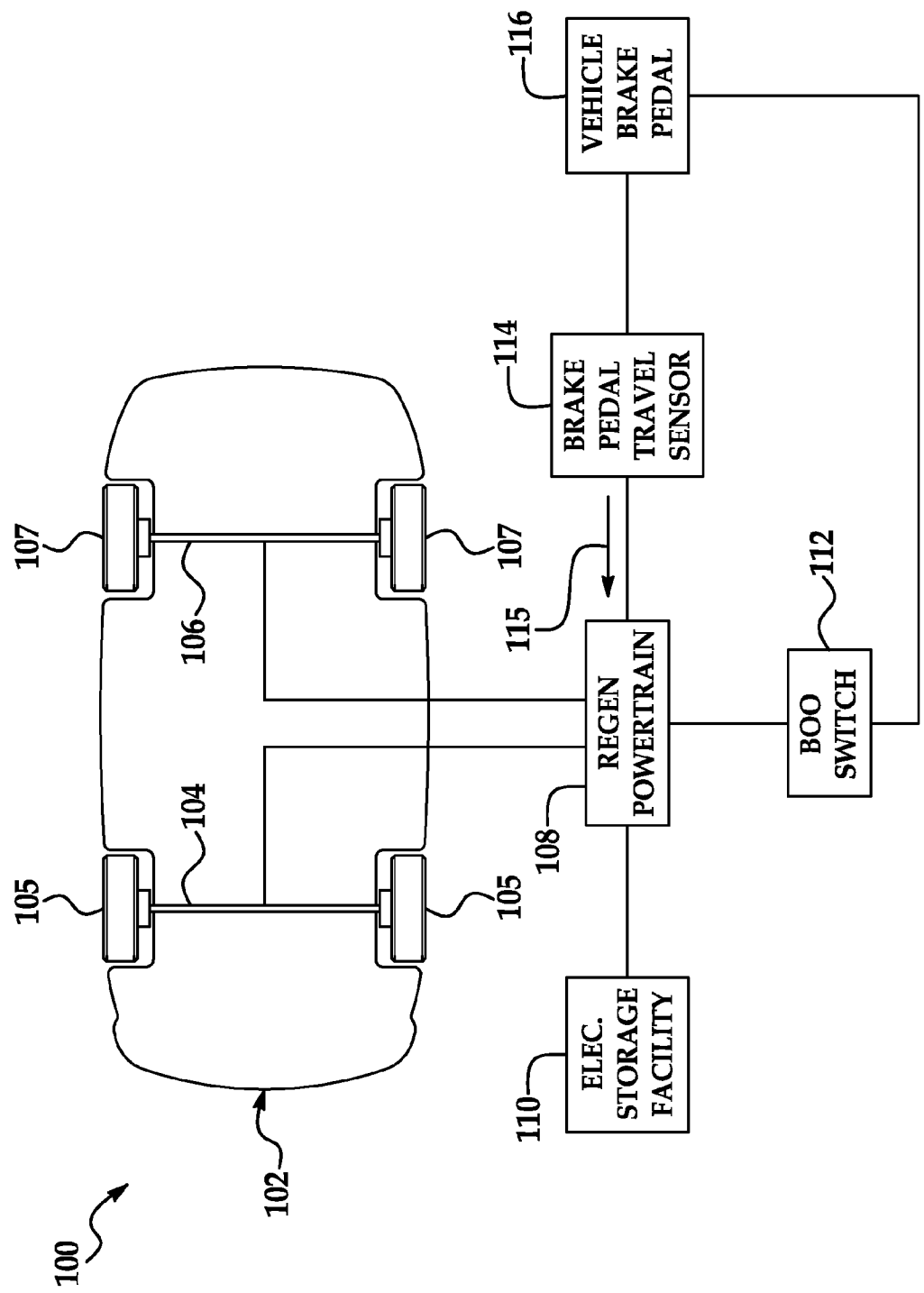
FIG. 1 is a block diagram which illustrates an illustrative embodiment of the parallel regeneration brake torque modulation method.

Referring initially to FIG. 1, an illustrative embodiment of the parallel regeneration brake torque modulation system, hereinafter system, is generally indicated by reference numeral 100. The system 100 may include a vehicle 102. In some embodiments, the vehicle 102 may include a hybrid electric vehicle (HEV) or a plug-in hybrid electric vehicle (PHEV), for example and without limitation. The vehicle 102 may have a front axle 104 with a pair of front wheels 105 and a rear axle 106 with a pair of rear wheels 107.

A regeneration powertrain 108 may interface with at least one of the front axle 104 and the rear axle 106 of the vehicle 102. In some embodiments, the regeneration powertrain 108 may interface with one or more front wheels 107 and/or one or more rear wheels 108 of the vehicle 102. The regeneration powertrain 108 may be adapted to apply regeneration torque to the front axle 104 and/or the rear axle 106 during braking of the vehicle 102, typically in the conventional manner. The regeneration powertrain 108 may be adapted to convert mechanical power from the rotating front axle 104 and/or rear axle 106 into electrical power. The electrical power may be stored in a battery or other suitable electrical storage facility 110 which electrically interfaces with the regeneration powertrain 108. The electrical power which is stored in the electrical storage facility 110 may be used in propulsion of the vehicle 102 such as in the conventional manner.

A brake pedal travel sensor 114 may interface with the regeneration powertrain 108. In some embodiments, the brake pedal travel sensor 114 may be hardwired into the regeneration powertrain 108. In some embodiments, the brake pedal travel sensor 114 may interface with the regeneration powertrain 108 via a controller area network (CAN) or the like. The brake pedal travel sensor 114 may electronically interface with a brake pedal 116 of the vehicle 102. The brake pedal travel sensor 114 may be adapted to sense the position of the vehicle brake pedal 116 throughout a range of movement of the vehicle brake pedal 116 during braking of the vehicle 102. The brake pedal travel sensor 114 may further be adapted to transmit a brake pedal travel sensor signal 115 to the regeneration powertrain 108 responsive to depression of the vehicle brake pedal 116. In response, the regeneration powertrain 108 may be adapted to apply regeneration torque to the front axle 104 and/or the rear axle 106 of the vehicle 102.

A BOO (Brake On/Off) switch 112 may interface with the regeneration powertrain 108. The BOO switch 112 may be adapted to actuate the regeneration powertrain 108 upon braking of the vehicle 102 under circumstances in which the regeneration powertrain 108 does not receive a brake pedal travel signal 115 from the brake pedal travel sensor 114.

In exemplary operation of the system 100, the regeneration powertrain 108 continually monitors whether the brake pedal travel sensor signal 115 is being received from the brake pedal travel sensor 114. During braking of the vehicle 102, the operator (not shown) of the vehicle 102 applies the brake pedal 116, which travels through at least a portion of its range of movement. Under normal circumstances, the brake pedal travel sensor 114 continually senses the position of the brake pedal 116 during its motion and transmits the brake pedal travel sensor signal 115 to the regeneration powertrain 108 via a controller area network (CAN) or the like. The brake pedal travel sensor signal 115 continually indicates the position of the vehicle brake pedal 116 to the regeneration powertrain 108 during vehicle braking. The regeneration powertrain 108 may modulate parallel regeneration braking of the vehicle 102 by applying the regeneration torque in a dynamic, gradual and non-stepwise manner to the front axle 104 and/or the rear axle 106 according to a magnitude which corresponds to the changing position of the vehicle brake pedal 116 within its range of motion. Under circumstances in which the regeneration powertrain 108 does not sense that the brake pedal travel signal 115 is being received from the brake pedal travel sensor 114, the BOO switch 112 may control parallel regeneration braking by the regeneration powertrain 108 typically in the conventional manner.

Figure 2:
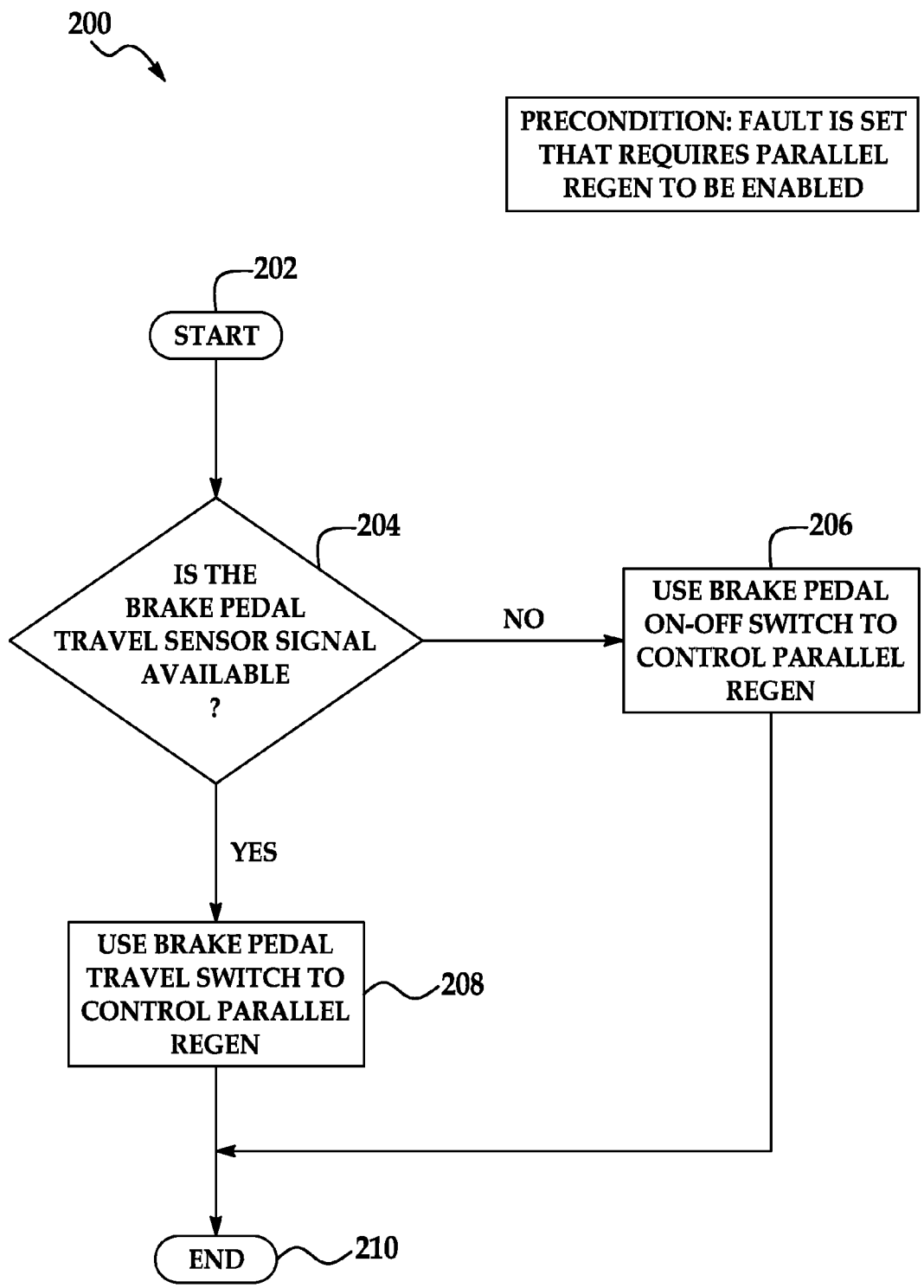
FIG. 2 is a flow diagram which illustrates an illustrative embodiment of the parallel regeneration brake torque modulation method.

Referring next to FIG. 2, an illustrative embodiment of the parallel regeneration brake torque modulation method, hereinafter method, is generally indicated by reference numeral 100. In some embodiments, a fault may be set which requires that parallel regeneration of a vehicle be enabled. The method 200 begins at block 202. In block 204, an inquiry may be made as to whether a brake pedal travel sensor signal is available. If the brake pedal travel sensor signal is not available, then in block 206 a brake pedal on/off (BOO) switch may be used to control parallel regenerative braking of the vehicle. The method may then end at block 210.

If the outcome to the inquiry in block 204 indicates that the brake pedal travel sensor signal is available, then in block 208 the brake pedal travel signal may be used to control parallel regenerative braking of the vehicle. The method may then end at block 210.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A parallel regeneration brake torque modulation system for an electrified vehicle, comprising:
a brake pedal travel sensor configured to transmit a brake pedal travel sensor signal upon travel of a vehicle brake pedal through at least a portion of a range of motion; and
a regeneration braking system configured to apply regeneration braking torque to the vehicle upon receiving the brake pedal travel sensor signal via a controller from the brake pedal travel sensor upon said travel of the vehicle brake pedal and further wherein the regeneration braking system is configured to apply the regeneration braking torque to the vehicle via a brake on/off switch when said brake pedal travel sensor signal is not received by said regeneration braking system upon said travel of the vehicle brake pedal;
wherein said regeneration braking system is further configured to modulate the regeneration braking torque in a gradual, non-stepwise manner at a magnitude responsive to a position of the vehicle brake pedal sensed by the brake pedal travel sensor.

2. The parallel regeneration brake torque modulation system of claim 1 wherein said brake on/off switch interfaces with the regeneration braking system, said brake on/off switch configured to close upon said travel of the vehicle brake pedal.

3. The parallel regeneration brake torque modulation system of claim 1 wherein the vehicle comprises a hybrid electric vehicle.

4. The parallel regeneration brake torque modulation system of claim 1 wherein the vehicle comprises a plug-in hybrid electric vehicle.

5. The parallel regeneration brake torque modulation system of claim 1 wherein said controller is adapted to store electrical power from said regeneration braking system.

6. The parallel regeneration brake torque modulation system of claim 1 wherein the regeneration braking system is adapted to apply regeneration torque to a selected one of front wheels and rear wheels of the vehicle.

7. A parallel regeneration brake torque modulation system, comprising:
a vehicle having a front axle with front wheels and a rear axle with rear wheels;
a regeneration powertrain coupled with and adapted to apply regeneration torque to at least one of the front and rear axles;
a brake pedal travel sensor interfacing with the regeneration powertrain;
a vehicle brake pedal interfacing with the brake pedal travel sensor, the brake pedal travel sensor configured to transmit a brake pedal travel sensor signal to the regeneration powertrain via a controller upon travel of the vehicle brake pedal through at least a portion of a range of motion;
a brake on/off switch interfacing with the regeneration powertrain; and
the regeneration powertrain is configured to apply via the controller, the regeneration torque to the at least one of the front and rear axles responsive to receiving said brake pedal travel sensor signal from the brake pedal travel sensor upon said travel of the vehicle brake pedal and further wherein a regeneration braking system is configured to apply the regeneration torque to the vehicle via said brake on/off switch when said brake pedal travel sensor signal is not being received by the regeneration braking system upon said travel of the vehicle brake pedal;

wherein the regeneration braking system is further configured to modulate said regeneration torque applied to the at least one of the front and rear axles by said regeneration powertrain via said controller in a gradual, non-stepwise manner at a magnitude responsive to a position of the vehicle brake pedal sensed by the brake pedal travel sensor.

8. The parallel regeneration brake torque modulation system of claim 7 wherein said brake on/off switch is configured to close upon said travel of the vehicle brake pedal.

9. The parallel regeneration brake torque modulation system of claim 7 wherein the vehicle comprises a hybrid electric vehicle.

10. The parallel regeneration brake torque modulation system of claim 7 wherein the vehicle comprises a plug-in hybrid electric vehicle.

11. The parallel regeneration brake torque modulation system of claim 7 wherein said controller electrically interfacing with the regeneration powertrain.

12. The parallel regeneration brake torque modulation system of claim 7 wherein the regeneration powertrain is configured to apply said regeneration torque to the at least one of the front axle and the rear axle of the vehicle.

13. A parallel regeneration brake torque modulation method for a vehicle, comprising:

receiving a brake pedal travel sensor signal by a controller upon travel of a vehicle brake pedal;

controlling parallel regeneration brake torque modulation for the vehicle by the controller upon receiving the brake pedal travel sensor signal by modulating a regeneration braking torque applied by a regeneration powertrain in a gradual, non-stepwise manner, the modulation of the regeneration braking torque at a magnitude responsive to a position of the vehicle brake pedal sensed by a brake pedal travel sensor configured to transmit said brake pedal travel sensor signal; and, controlling said parallel regeneration brake torque modulation of the vehicle if the brake pedal travel sensor signal is not received by the controller upon said travel of the vehicle brake pedal by actuating the regeneration powertrain in response to actuation of a brake pedal on/off switch.

14. The method of claim 13 wherein said brake pedal on/off switch is configured to close upon said travel of the vehicle brake pedal.

15. The method of claim 13 wherein controlling parallel regeneration brake torque modulation of said vehicle comprises applying the regeneration braking torque to at least a front axle or a rear axle of said vehicle.

16. The method of claim 13 wherein the controlling parallel regeneration brake torque modulation of said vehicle comprises said vehicle being a hybrid electric vehicle.

17. The method of claim 13 wherein the controlling parallel regeneration brake torque modulation of said vehicle comprises said vehicle being a plug-in hybrid electric vehicle.

* * * * *